3,281,838
AUTOMATIC ANGLE TRACKING APPARATUS
Oscar L. Morris, Merritt Island, and Arthur F. Penfield, Eau Gallie, Fla., assignors to the United States of America as represented by the Secretary of the Air Force
Filed Dec. 23, 1964, Ser. No. 420,838
6 Claims. (Cl. 343—7.4)

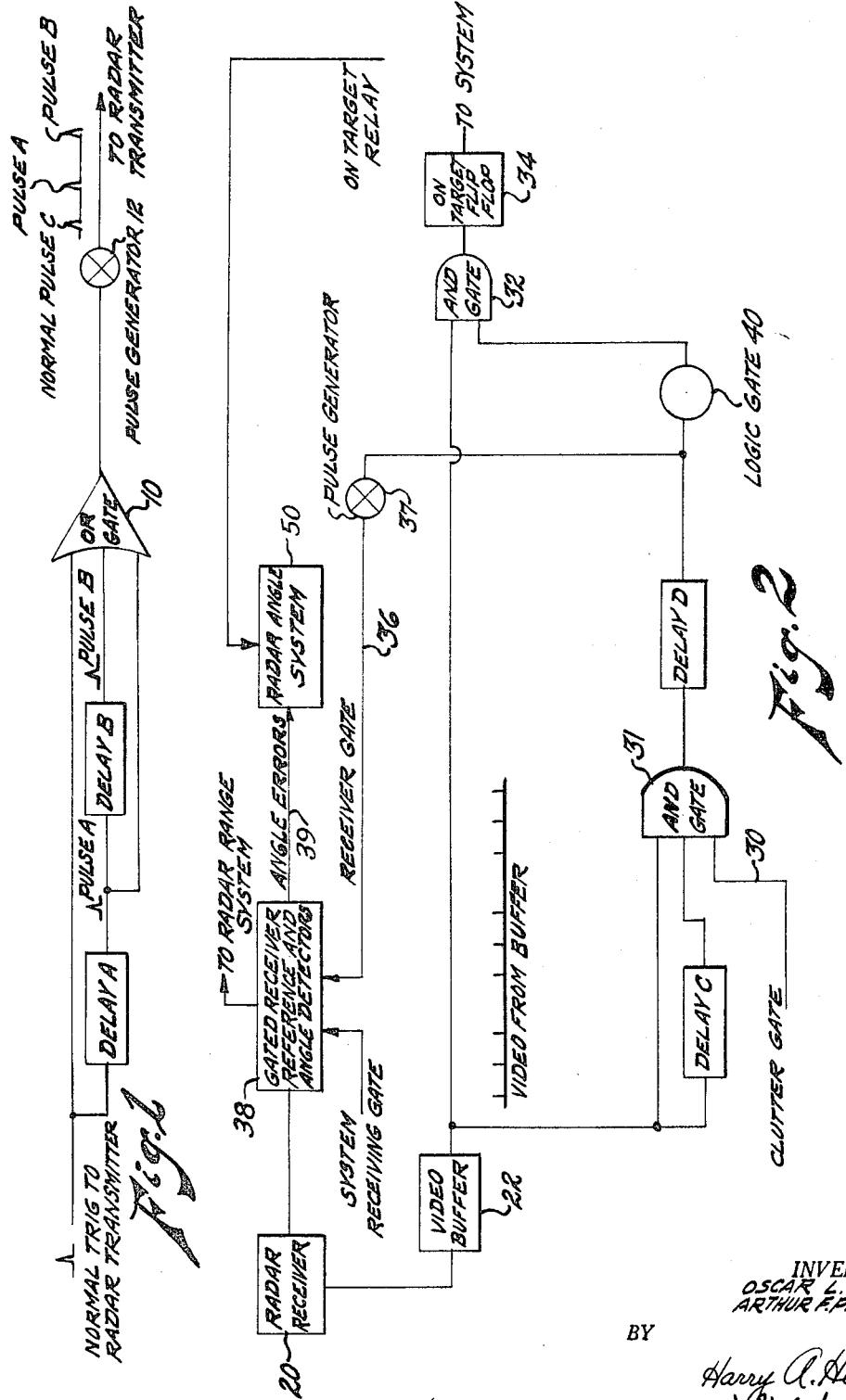

This invention relates generally to echo and beacon reply type radar systems, and, more particularly, to systems which provide automatic angle tracking of a fast-moving distant target.

Radar systems have great utility in tracking ballistic and orbital vehicles or other fast-moving targets. Radar tracking systems are used in single station or chain operation. These radars may generate metric missile trajectory data which may be used for post-flight data processing, as well as for real-time Range Safety Impact Prediction. Other applications include real-time present position displays and target designation for other tracking systems (radar telescope).

Pulse radar systems typically radiate short burst pulses (of high-power) R-F energy towards a target in space and determine the elapsed time between pulse radiation and signal return (echo or beacon reply) as a linear measure for the target distance. When a radar is "skin" tracking a missile, it is using reflected energy (echo reply) to develop error signals for the servo systems. When beacon tracking, the radar transmits an R-F pulse to a beacon transponder (receiver and transmitter) in the missile; the radar pulse triggers the airborne transmitter which, in turn, transmits a new pulse (beacon reply) back to the ground-based radar.

Conventional tracking radars are designed to track only one target at a time by "gating" the desired signal with respect to range and by referencing the automatic range and angle measurements to the gated signal. Pulse transmission, controlled by the PRF generator and modulator, may consist of single pulses or pulse groups. Single pulses are used for skin track and interrogation of uncoded beacons. Groups of two or more narrow-space pulses are used when the radar tracks a coded beacon.

A tracking radar utilizing the instant invention may operate at C-band frequencies (5450–5825 megacycles). A typical tracking radar transmits a pulse (burst of R-F energy) into space 160 times a second. This results in a pulse repetition frequency (PRF) of 160 and pulse repetition time (PRT) of 6250 microseconds. If a target is in the beam of the antenna, the burst of energy is reflected back to the antenna where it is received by the system receivers. In the receivers it is: (1) detected, namely, converted from R-F energy into video information and distributed to the console (for operator viewing); and (2) gated, namely, allowing only a small portion of the 6250 microsecond intervals to be viewed by the automatic range and angle systems of the radar.

However, a limitation on prior art tracking radar that exits when acquiring the proper target is that the narrow beam used with such devices illuminates only a small cone in space. Therefore, the antenna is usually scanned about the desired point in space to increase the probability of illuminating the targets and thus receive a return (reflected R-F energy) from the target. If the scan rate is high and the target area small, the target is illuminated only for small periods.

The above limitation is compounded by the fact that random noise spikes can confuse simple threshold systems that respond to a signal of a given level above noise. This problem is further compounded when the desired target is small and reflects little energy. Also, if the range position of the target (range from the radar to the target) is not accurately known, prior art automatic tracking cannot commence until the range gate is moved to the target; thus the target can move out of the antenna beam during the time necessary to properly position the range gate (and consequently the receiver gate). And in applications where the target carries a beacon (a device that re-transmits any received pulse), the beacon responds to all radars that illuminate (interrogate) it. This means that if, for example, six radars are interrogating the beacon—six returns are available for each radar—only one of which is the correct target.

Accordingly, an object of this invention is to provide automatic angle tracking apparatus which obviates the above limitations.

Another object of this invention is to provide automatic angle tracking apparatus which reduces both radar target acquisition time and automatic lock-on time.

Another object of this invention is to provide automatic angle tracking apparatus which discriminates against the incoming energy to inhibit noise spikes and return rabbets generated by other radars while passing valid returns of the subject radar.

Still another object of this invention is to provide automatic angle tracking apparatus which gates the target so it may be immediately angle tracked even though the radar range gate has not yet been properly positioned.

These and other objects are accomplished by the instant invention wherein a transmitter is caused to emit three pulses with discrete times between pulses; thus, a target will reflect these pulses with the same discrete time spacing. This time spacing is used to first identify that the target is valid, and second, to allow a receiver gate to be placed properly in time to permit tracking of the third pulse. This allows automatic angle tracking even though the normal radar range receiver gate is not aligned to the target.

Various other objects and advantages will appear from the following description of one embodiment of the invention taken in connection with the accompanying drawings wherein:

FIG. 1 is a block diagram of the pulse transmitter; and
FIG. 2 is a block diagram of the instant automatic tracking receiver identification unit.

Now referring to FIG. 1, the normal trigger, pulse C, to the radar transmitter (which is generated in the range subsection of the radar) is interrupted and fed through "or" gate 10. The normal trigger is also fed through Delay A, generating pulse A, to "or" gate 10. A third pulse, pulse B (generated from both Delay A and Delay B) is fed to gate 10. The delay generator output is then fed to conventional pulse generator 12. This action results in three pulses (spaced in time by Delay A between the normal pulse and the first delayed pulse and by Delay B between the first delayed pulse and the second delayed pulse) being sent to the Radar Transmitter where they each trigger the generation of the high power R-F energy which is beamed into space by the radar dish antenna. (In the case of coded beacons, three code groups are developed; the three pulses are far enough apart to allow beacon recovery, namely, the beacon will reply three times to this radar.)

For a radar operating in the C-band, it has been found desirable to have the three transmitted pulses separated by 68K yds. The first pulse is the actual modulator trigger. The second pulse is the modulator trigger delayed by 68K yds. The third pulse is the second pulse delayed an additional 68K yds. (If a coded beacon is used, a blocking oscillator is added to the circuitry to insure that the modulator trigger and coded input trigger rise time are the same.)

Now referring to FIG. 2, all reflected (received) R-F energy in the beam of the antenna is amplified by receiver 20. This includes returns from ground clutter, clouds, noise, rabbets, and valid returns reflected by any target within the antenna beam. The signals received from a valid target have the same relative time relationships as the transmitted pulses. Receiver 20 is sampled by video buffer 22 which is essentially a threshold device that converts all return signals above a pre-set level into logic level pulses (constant amplitude, constant width) that can properly be handled by following digital circuitry. For example, buffer 22 may be set for approximately 10 to 50 noise hits per second.

The output of video buffer 22 is examined for three return signals with the same time space characteristics as those previously transmitted. All video is examined except that immediately following the transmitter pulses. Adjustable clutter gate circuitry (not shown) is used to inhibit the examination of the three transmitter pulses as well as the associated ground clutter and close returns. Namely, the clutter gate circuitry blanks an area during and after the transmitter pulses to prevent auxiliary track lock-on on these pulses. Clutter width control permits varying the Gate width. For example, for a time-delay of 68K yds. the clutter width control is set greater than 136K yds. Clutter Gate output 30 is utilized to inhibit And Gate 31 at the time of each modulator trigger.

All returns outside the clutter Gate are processed by And Gate 31 in conjunction with receiver Delay C. And Gate 31 has three inputs: clutter Gate output 30, all video pulses exceeding a preset threshold, and the output of Delay C. If any received pulse delayed by Delay C is time coincident with another received pulse, And Gate 31 identifies the second of the above-mentioned pulses as the second valid return. Thus, an output from And Gate 31 occurs when the second pulse undelayed and the first pulse delayed are present. This identifies the return as one that this radar transmitted (and not a noise return).

The output from And Gate 31 is fed to Delay D. If the pulse delayed by receiver Delay D is in time with another output from video buffer 22, And Gate 32 is satisfied and in effect says, "since this return is the third pulse and all three properly spaced pulses have been received, this is a valid target and the radar should be removed from the scan mode and placed in the automatic track mode." This action is accomplished by "on target flip-flop 34" which sends a control level to the necessary existing radar circuitry (not shown) to change modes.

It is to be noted that the output of Delay D also acts via the receiver gate pulse generator 37 and signal conductor 36 to open up receiver 38, thus allowing the third pulse to be conducted via the angle errors conductor 39 to the radar angle system 50 and permitting angle autotrack to take place. This is accomplished by applying the output from Delay D to blocking oscillator 37 whose output is coupled to the radar range system through gated receiver 38. As an end result, the blocking oscillator output positions the receiver Gate to the video No. 3 pulse. In its actual mode of operation, receiver Delay D is adjusted slightly shorter than transmitter Delay B to allow the gates (receiver and logic) to be initiated slightly earlier so these gates will straddle the third received pulse.

Summarizing the above-described mode of operation, by considering all returns (whether noise, rabbits, or valid returns) to be pulse C returning from the target and by starting time Delay C with a time length "X" at this considered pulse "C"; then, when the timer completes time "X," pulse A should have just arrived from the target. If a pulse is not present at this time, no action takes place. But if a pulse is present at time "X" after any pulse, this second pulse is considered to be pulse A and the following assumptions may be made: the composite returns are not noise spikes; the returns are not from other radars; and the returns do represent a valid target return of the subject radar. Upon receipt of pulse A, time Delay D, with a time length "Y" is started. When time "Y" is complete, pulse B should be arriving from the target. The gated receiver is opened in anticipation of pulse B returning (to allow angle tracking). And gate 32 (through logic gate 40) checks to see whether pulse B did in fact arrive at time "Y" after pulse A. If pulse B did arrive on time, there is an extremely good chance that this is a valid target and the antenna is automatically removed from the scan mode and placed into the track mode. It is to be noted that the only function of logic gate 40 is polarity correction for operation of And gate 32 after Delay D polarity is chosen to properly trigger pulse generator 37; thus, logic gate 40 can be omitted entirely without affecting the mode of operation.

From the foregoing, it can be seen that the instant invention affords the advantages of quick identification and angle track of valid (not return of other radar) returns. This allows higher angle scan rates about the designated position with narrow beam radar than acquisition systems relying on either the operator or a multiple PRF solution. Also, if the target is lobing and loss of track occurs, the target is automatically tracked when again visible to the radar. The instant invention is independent of the pulse repetition rate, and a consistent time base is not required.

It will be understood that various changes in the details and components, as herein described and illustrated in order to explain the nature of the invention, may be made by those skilled in the art without departing from the true scope and spirit of the invention in its broader aspects as defined in the appended claims.

We claim:

1. In a radar system, automatic target tracking apparatus comprising means for transmitting into space three radio frequency pulses separated by predetermined time intervals, means for receiving radio frequency energy, pulse identification means connected to the output of said receiving means, said pulse identification means generating an output only when the first two of said transmitted pulses are reflected by said target, and automatic angle tracking means connected to the output of said pulse identification means.

2. The apparatus as described in claim 1 wherein said means for transmitting said three pulses comprises first and second transmitter delay means, each of said delay means having a predetermined time delay.

3. The apparatus as described in claim 1 wherein said pulse identification means comprises buffer means connected to said means for receiving radio frequency energy for forming energy received into a predetermined shape, recognition means comprising first and second receiver delay means connected to said buffer means for generating an output only when the first and second received pulses of said three transmitted pulses have been identified, and means connected to the output of said recognition means to permit tracking the third pulse received of said three transmitted pulses.

4. Apparatus as described in claim 3 wherein the time length of said second receiver delaying means is slightly shorter than the time length of said second transmitter delaying means.

5. In a radar tracking system for tracking a moving object in space, the method of automatic angle tracking, without the use of range track, comprising the steps of transmitting three pulses of radio frequency energy having discrete time spacings between each of said three pulses, using the first of said time spacings to identify valid moving object returns, and using the second of said time spacings to permit automatic tracking of the third of said three pulses.

6. In a target tracking radar system, the method of automatic angle tracking comprising the steps of transmitting into space three radio frequency pulses having a predetermined time spacing between each of said three pulses, discriminating between the first two of said three pulses reflected by said target to determine if said target is valid, and tracking the third pulse of said three pulses when received.

References Cited by the Examiner

UNITED STATES PATENTS 2,412,974  12/1946  Deloraine.
3,212,090  10/1965  Tiffany _____ 343—17.1

CHESTER L. JUSTUS, *Primary Examiner.*

T. H. TUBBESING, *Assistant Examiner.*